E. G. ACHESON.
PROCESS OF MAKING GRAPHITE.
APPLICATION FILED APR. 9, 1909.
Reissued June 1, 1909. 12,964.
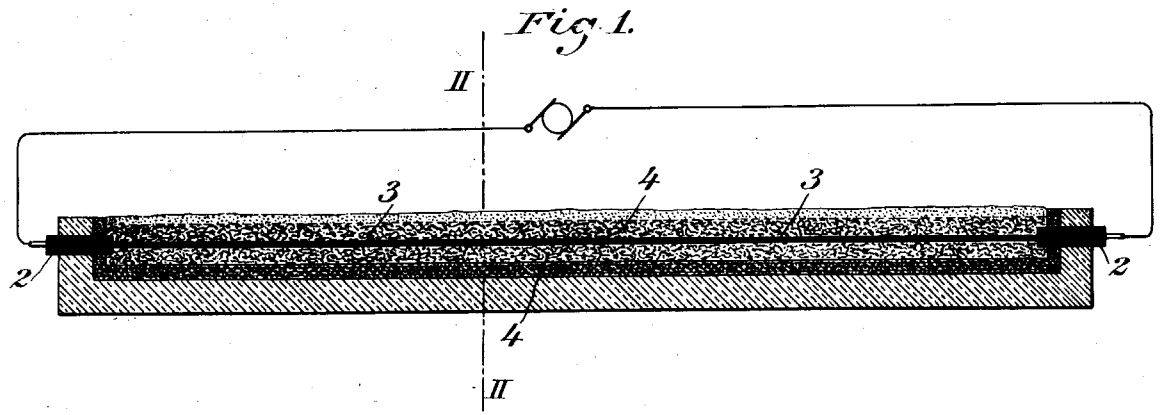
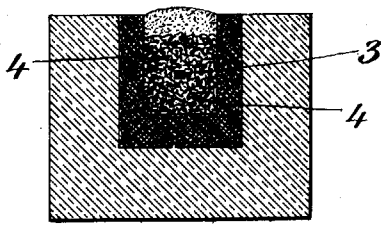
Witnesses:
Alex. Scott
D. W. Edelin.
Inventor:
Edward G. Acheson
by Byrnes Townsend & Brickenstein,
Attorneys.

UNITED STATES PATENT OFFICE.

EDWARD GOODRICH ACHESON, OF NIAGARA FALLS, NEW YORK, ASSIGNOR TO THE INTERNATIONAL ACHESON GRAPHITE COMPANY, OF NIAGARA FALLS, NEW YORK, A CORPORATION OF NEW JERSEY.

PROCESS OF MAKING GRAPHITE.

No. 12,964. Specification of Reissued Letters Patent. Reissued June 1, 1909.

Original No. 711,031, dated October 14, 1902, Serial No. 40,756. Application for reissue filed April 9, 1909. Serial No. 489,026.

*To all whom it may concern:*

Be it known that I, EDWARD GOODRICH ACHESON, of Niagara Falls, in the county of Niagara and State of New York, have invented a new and useful Process of Making Graphite, of which the following is a full, clear, and exact description, reference being had to the accompanying drawings, forming part of this specification, in which—

Figure 1 shows in vertical longitudinal section a furnace adapted for the practice of my invention. Fig. 2 is a vertical cross-section thereof on the line II II of Fig. 1.

Heretofore in accordance with the processes invented and patented by me graphite has been made in electric furnaces by subjecting to the intense heat of such furnaces carbon admixed either naturally or artificially with materials capable of forming carbids. I have now discovered a process whereby carbon, either devoid of such carbid-producing material or containing it in insufficient proportions or insufficiently distributed, may be converted into graphitic form. The invention is of great value, because it renders available materials which heretofore were not useful for this purpose, and it conduces greatly to the ease of manufacture and regularity and thorough graphitization of the product.

I have discovered that a very perfect transformation of amorphous carbon may be produced by causing metallic vapors to act upon the amorphous carbon at the high temperature which is obtainable in an electric furnace and that this can be brought about by subjecting metals or metallic compounds to heat in an electric furnace containing the amorphous carbon, thus volatilizing the metal or compound and causing the vapor thereof to permeate the mass of carbon which forms the charge of the furnace.

While various forms of amorphous carbon may be used and the carbon may be drawn from various sources and various metals and compounds capable of determining the conversion of carbon into graphite may be employed for generating the vapor—such as iron, silicon, titanium, aluminum, boron, or compounds thereof—I will describe my process with reference to amorphous carbon obtained from the distillation of petroleum-oil, known in commerce as "petroleum-coke," and with iron as the metallic agent. In an electric furnace which may be constructed, as shown in Fig. 1, with electrodes 2 2 extending into it at the ends, I place petroleum-coke, broken to such state that its particles vary in size from a powder to lumps, measuring, say, three inches or four inches in diameter and preferably in such proportion that the lumps are fully and completely embedded in the powder. Through this mixture I scatter or roughly mix oxid of iron in the proportion of, say, five pounds of iron oxid to one hundred pounds of coke. I also place in the furnace extending through the charge a conductor composed, preferably, of carbon rods or plates 3 3, which are in contact with each other and are connected with electrodes at the ends of the furnace. The entire charge of coke (indicated in the drawings by the reference-numeral 4) is preferably covered with an air-excluding layer of non-heat-conducting material, which may be sand and powdered carbon in proper proportion to form carbid of silicon. The furnace being thus charged an electric current is caused to pass through the carbon rods embedded in the charge mixture.

With a furnace of, say, thirty feet in length, fourteen inches in width, and eighteen inches deep a current of about two hundred volts and three hundred amperes is suitable. This current will quickly increase in volume as the result of the lessened resistance of the carbon rods and of the surrounding coke as the temperature increases.

After the operation is complete, which is indicated by a great reduction of the resistance, and when sufficient time has elapsed for the cooling of the contents of the furnace the covering of sand and carbon, which has been partially converted into carbid of silicon, is removed and the coke which has been converted into soft-graphitic carbon is taken from the furnace.

During the operation of the furnace the oxid of iron that has been scattered throughout the carbonaceous material is first reduced, the iron being brought to the metallic state, and the reduced iron is either held in the cavities and interstices of the pieces and lumps of coke or settles in a mass to the floor of the furnace, whence as the operation continues and the temperature rises it is volatilized and more or less fills the entire furnace, thus coming into intimate contact with the carbon contained therein, and, as I have discovered, it produced at the high temperature employed the conversion of the amorphous carbon into graphite.

The function of the rods above described is to serve as a preliminary conductor for the current, and as such conductor is not essential to my invention it may be constituted in various ways and forms or may be omitted where the carbon to be graphitized is sufficiently conducting. The form and construction of the furnace may be modified without departing from the principles of my invention. It is also possible to vary the relative amount of the metallic element employed.

From the foregoing description those skilled in the art will be enabled to employ my invention in the graphitization of various kinds of amorphous carbon and to use in the process various kinds of metals or metallic compounds as the source of the vapor by which the charge of the furnace is permeated.

I claim as my invention—

1. The method herein described of making graphite, which consists in introducing into an electrical furnace a mass of carbon to be graphitized, in the form of lumps, and also introducing thereinto a volatilizable material capable of forming a carbid, and heating the same to a high temperature, vaporizing the volatilizable material, thereby causing the vapor to permeate the charge of lumps and to graphitize the same; substantially as described.

2. The method herein described of making graphite, which consists in introducing into an electrical furnace a mass of carbon in the form of discrete lumps, and also introducing thereinto a volatilizable material capable of forming a carbid, and heating the mass to a high temperature, vaporizing the said element or compound, thereby causing the vapor to permeate the charge of lumps and to graphitize the same; substantially as described.

3. The method herein described of making graphite, which consists in introducing into an electrical furnace a mass of carbon in the form of discrete lumps embedded in powdered carbon, and also introducing thereinto a volatilizable material capable of forming a carbid, and heating the mass to a high temperature sufficient to vaporize the said element or compound and to graphitize the carbon; substantially as described.

4. The method herein described of making graphite, which consists in introducing into an electrical furnace a mass of petroleum-coke to be graphitized, and also introducing thereinto a volatilizable material capable of forming a carbid, and heating the same to a high temperature sufficient to vaporize the said volatilizable material and to graphitize the carbon; substantially as described.

In testimony whereof I have hereunto set my hand.

EDWARD GOODRICH ACHESON.

Witnesses:
W. A. SMITH,
ORRIN E. DUNLAP.